Sept. 24, 1968   E. HENRY-BIABAUD   3,402,789
DISC BRAKE FRICTION PAD AND RESILIENT SUPPORT MEANS THEREFOR
Filed Dec. 29, 1966   2 Sheets-Sheet 1

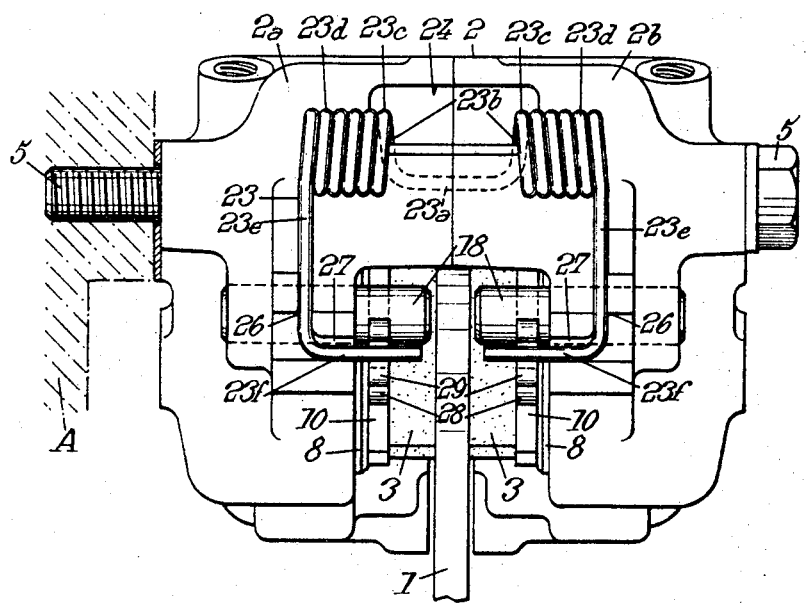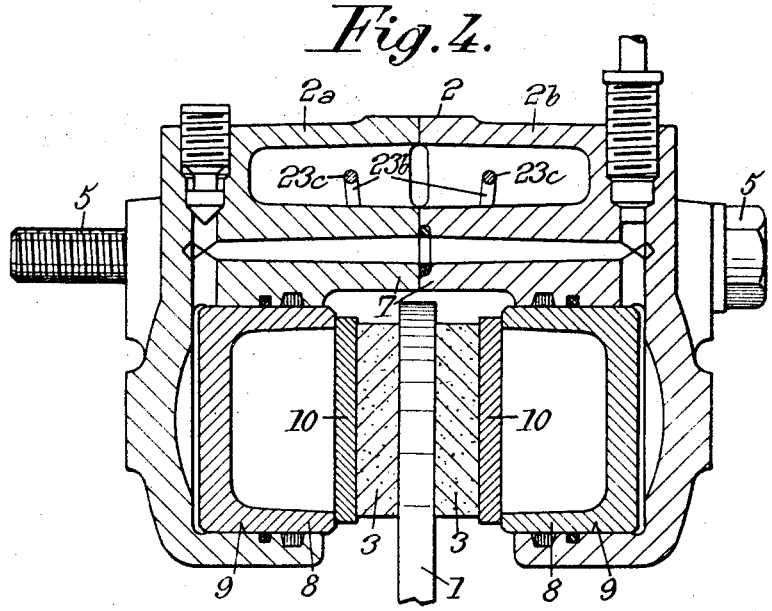

United States Patent Office 3,402,789
Patented Sept. 24, 1968

3,402,789
DISC BRAKE FRICTION PAD AND RESILIENT SUPPORT MEANS THEREFOR
Edmond Henry-Biabaud, Paris, France, assignor to Société Anonyme André Citroën, Paris, France, a society of France
Filed Dec. 29, 1966, Ser. No. 608,719
Claims priority, application France, Dec. 29, 1965, 44,120
7 Claims. (Cl. 188—73)

ABSTRACT OF THE DISCLOSURE

A brake frame is disposed astride the brake disc, the brake frame supporting a friction member on each side of said disc. Each fraction member includes a pad supported by a plate including two bearing surfaces cooperating with two holding surfaces rigid with the frame. All these surfaces are cylindrical with a common axis about which, after a retractable abutment has been brought out of action, the friction member plate can pivot to permit of removing a worn friction member and resetting a new friction member parallelly to the plane of the disc. The two retractable abutments consist of the end portions of a spring permanently secured to the brake frame.

---

The present invention relates to disc brakes, in particular for automobile vehicles, of the kind including a disc driven in rotation by a shaft to be braked, a brake frame disposed astride a portion only of the periphery of the disc, two friction pads mounted on said frame and located on either side, respectively, of the disc, in such manner that at least one of them can slide with respect to said frame in a direction parallel to said shaft, and means for displacing the movable friction pad or pads with respect to the frame in a direction such that the disc is tightly caught between the two friction pads. The invention is more especially concerned with brakes of this kind wherein the disc and the frame are both fixed in the direction parallel to the shaft and both of the friction pads are movable and actuated separately by said means respectively.

It has already been proposed in the United States Patent No. 3,285,371 filed on Jan. 6, 1965 by Jean Cadiou and entitled "Spot Type Disc Brakes," to provide in a brake of this kind, on at least one of the friction pads and/or on a rigid plate carrying said friction pad fixed thereto, two cylindrical bearing surfaces having a common axis parallel to the axis of the above mentioned shaft, said cylindrical surfaces having circular arcs as directrices, and to provide the frame, on the one hand, with cylindrical holding surfaces adapted to cooperate with the above mentioned bearing surfaces, respectively, and having the same radii as them, so that the fraction pad that is considered can pivot about said common axis through a limited angle, and, on the other hand, with at least one abutment adapted normally to prevent this pivoting movement, this abutment being retractable in such manner that, once it has been retracted, it permits said pivoting movement until one of the bearing surfaces of the friction pad, and/or of the supporting plate thereof, escapes from the holding surface of the frame and thus permits of removing the friction pad in a direction parallel to the corresponding face of the disc either tangentially between the two branches of the frame located on opposite sides, respectively, of the disc, or radially through an opening provided in the structure connecting these two branches with each other.

The chief object of the present invention is to make said retractable abutment such that it can be of easy construction, quick to remove and to reset into position, and of safe operation.

The invention consists chiefly in constituting said retractable abutment by a portion of a spring fixed to the frame at a place such, and having a resilient strength such, that said portion of the spring is constantly urged toward the position for which it keeps the corresponding pad in active position, the whole being such that this portion of the spring, to be moved away from said position, requires a deliberate effort exerted thereon greater than the accidental stresses to which it may be subjected in operation.

A preferred embodiment of the present invention will be hereinafter described with reference to the appended drawings, given merely by way of example, and in which:

FIG. 3 shows this brake seen from the left of FIG. 1; and

FIG. 4 shows this brake in section on the line IV—IV of FIG. 1.

Figure 1:
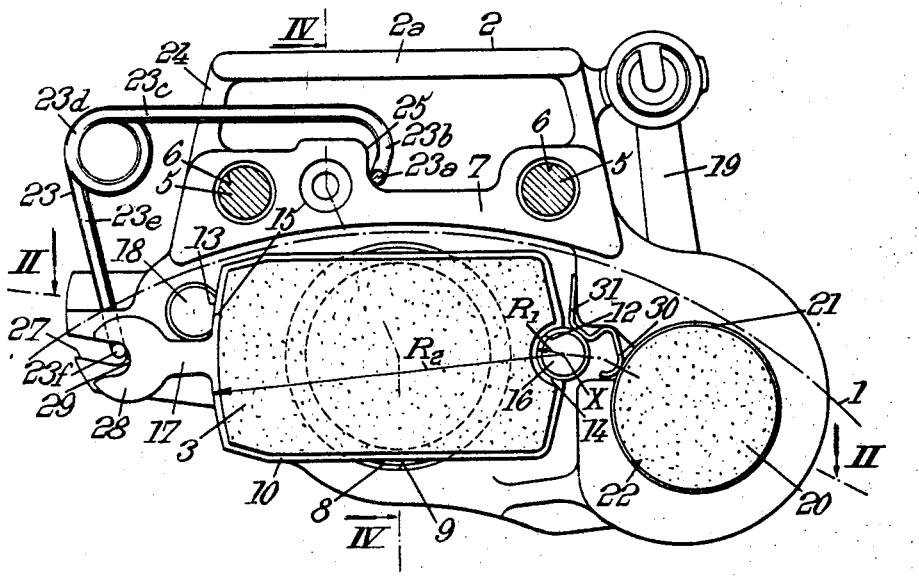
FIGS. 1 and 2 are, respectively, a vertical section on the line I—I of FIG. 2, and a horizontal half section on the line II—II of FIG. 1 of a brake made according to the present invention.

The brake comprises the following elements:

A disc 1 driven by a shaft (not shown) to be braked;

A brake frame 2 disposed astride a portion of the periphery of disc 1;

Two friction pads 3 mounted on opposite sides of disc 1 on frame 2 in such manner that at least one of them can slide with respect to said frame in a direction parallel to the shaft of disc 1; and Means for moving the movable friction pad or pads with respect to frame 2 in the direction for which disc 1 is tightly caught between the two pads.

In what follows it will be supposed that disc 1 and frame 2 are both fixed in a direction parallel to the disc shaft and that the friction pads are both movable and actuated separately by the above mentioned means.

Frame 2 consists of two elements 2a and 2b juxtaposed to each other approximately in the mean plane of disc 1 and assembled with each other and with a fixed portion A of the vehicle by means of bolts 5 engaged in holes 6 provided in said elements 2a, 2b on the outside of the outline of disc 1. For instance, frame 2 is of C-shaped profile so that the middle portion of the C profile makes it impossible to have access to the friction pads in the radial direction of the disc. In particular, according to the embodiment shown by the drawings, where the frame consists of elements 2a, 2b the portions 7 of said elements through which they are fitted against each other and the inner surfaces of which are close to the periphery of disc 1 make it impossible to reach friction pads 3.

In order to actuate the friction pads, use can be made of hydraulic (or pneumatic) means consisting of pistons 8 slidable in cylinders 9, said cylinders being provided in frame 2 or fixed thereto and being for instance fed simultaneously with fluid under pressure. Said means may be completed or replaced by mechanical means (not shown).

On each friction pad 3, or preferably, as shown, on the rigid plate 10 which carries this pad, there is provided a pair of cylindrical bearing surfaces 12 and 13 having a common axis X parallel to the axis of the shaft of disc 1 and having circular arcs as directrices. There is further provided, on frame 2, on the one hand, cylindrical holding surfaces 14 and 15 intended to cooperate with the above mentioned bearing surfaces 12 and 13, respectively, in such manner that friction pads 3 can be pivoted about axis X through a limited angle and, on the other hand, at least one abutment normally preventing this pivoting movement.

As shown by FIG. 1, bearing surface 12 may be concave and bearing surface 13 convex, the respective holding surfaces 14 and 15 being of corresponding shapes, respectively. Holding surface 14 may be constituted by a pin 16 passing through element 2a (or the symmetrical element 2b) and projecting to the inside of frame 2 to a short distance from the adjacent side surface of disc 1. The common radius $R_1$ of surfaces 12 and 14 is substantially smaller than the common radius $R_2$ of surfaces 13 and 15. In order to prevent the pads from pivoting about axis X, there is provided, on one side of a tongue 17 belonging to plate 10, a fixed abutment consisting for instance of a pin 18 fixed to element 2a or 2b and, on the other side of said tongue 17, a retractable abutment which will be hereinafter described. Pin 18, which is parallel to pin 16, is cut so as to form holding surface 15 (see FIG. 1).

The whole may include an auxiliary mechanical brake including, for instance, levers such as 19 (supposed to have been removed in FIG. 2) adapted to apply against disc 1 pads 20 carried by plates 21 and mounted slidable in cylindrical housings 22 provided respectively in the elements 2a and 2b of frame 2.

Such a disc brake works as follows:

When pads 3 are pressed by pistons 8 against the faces of disc 1, their plates 10 slide in contact with holding surfaces 14 and 15. The braking reaction is transmitted usually to holding surfaces 14 (braking when the vehicle is running forward) or possibly to holding surfaces 15 (braking when the vehicle is running backward).

In the first case, the braking reaction is received wholly by holding surfaces 14 without producing a radial component. In the second case, the braking reaction is received by holding surfaces 15 and gives rise to a very small radial braking component, which is always smaller than the component of adhesion on holding surfaces 15. It will therefore be understood that the retractable abutments which will be hereinafter referred to are not subjected to the braking reactions and serve merely to keep pads 3 in position.

When a pad 3 is worn, the retractable abutment is retracted and plate 10 is pivoted about its axis X through an angle just sufficient to enable the bearing surface 13 of the plate to escape from the holding surface 15 of the frame. The whole of the plate and pad that are considered can then be removed by moving these elements away from the holding surface 14 in an approximately tangential direction with respect to disc 1. A new plate and pad can then be set in position by reverse operation.

According to a modification (not shown by the drawings), the elements 2a and 2b of frame 2 are in contact with each other only in the vicinity of bolts 5, portions 7 being then done away with, whereby there remains between these two elements a space such that friction elements 3, 10, when released, can pass therethrough, in the radial direction, that is to say toward the top of FIG. 1.

According to the constructions disclosed in the above mentioned prior patent, the retractable abutment above referred to consists of a rigid element made of a screw fixed to frame 2, or fixed by a screw to frame 2. This arrangement supposes that the setting or resetting of the pads has been performed correctly, with a blocking of the screw with an effort corresponding to the screw thread conditions of the screw and to the nature of the material used for the screw and for the piece in which it is engaged. Otherwise, the screw may escape, which involves the loss of the corresponding pad.

In order to eliminate this risk, according to the present invention the retractable abutment is constituted by a portion of a spring mounted on frame 2 in a location such, and having a resilient action such, that said spring portion is constantly urged toward the position for which it keeps the corresponding pad in active position, the whole being arranged so that this spring portion requires, to be moved away from said position, a deliberate effort greater than the accidental stresses (due to vibration for instance) to which it may be subjected.

In the embodiment shown by the drawings, this spring includes a middle portion hooked to frame 2 and extending transversely the plane of disc 1 and two end portions forming the retractable abutments for pads 3 and/or their backing plates 10.

In the embodiment shown by the drawings, said spring consists of a piano wire 23 symmetrical with respect to the middle plane of disc 1, including a middle portion 23a parallel to the axis of disc 1 and, on each side of this middle portion 23a: a bent portion 23b; a straight portion 23c (FIG. 1) substantially perpendicular to the radius of the disc passing through the middle point of middle portion 23a; a coiled portion 23d having its axis substantially parallel to that of the disc (FIG. 3); a straight portion 23e extending toward the axis of the disc to a distance from said axis smaller than the radius of said disc; and, finally, an end portion 23f bent toward the disc so as to form the above mentioned retractable abutment. The coiled portions 23d are intended to permit a relatively great amplitude of angular deformation between straight portions 23c and 23e and a substantial possibility of movement of the end portions 23f when straight portions 23c are secured in fixed position.

In order to keep wire 23 in position in frame 2, the latter is provided with an aperture 24 the width of which in a direction parallel to the axis of disc 1 is hardly greater than the distance between straight portions 23c, as shown by FIG. 3, and also this frame is provided with a projection 25 capable of holding the middle portion 23a of the spring as shown by FIG. 1. One half of aperture 24 is in element 2a and the other half in element 2b. Furthermore, each of the elements 2a and 2b is provided with a notch 26 keeping straight portions 23e at a fixed distance from the plane of the disc and also with a notch 27 keeping the corresponding wire end portion 23f at a given distance from the axis of the disc. Finally, each plate 10 is provided, at the free end of its tongue 17, with a lug 28 provided with a notch 29 registering with the adjacent notch 27 when tongue 17 is bearing against pin 18. The outline of the upper portion of lug 28 (FIG. 1) has a rounded shape, as clearly shown by FIG. 1, for the reason which will now be stated.

It will be seen that, on the one hand, spring 23 is held in position by the edges of aperture 24 and by projection 25 without risk of being detached from frame 2 and, on the other hand, the end portions 23f of the spring, guided in notches 27 and engaged in the notches 29 of plates 10, keep friction pads 3 in working position without said pads being able to be released accidentally.

The rounded shape of the upper outline (FIG. 1) of lug 28 is such that, in order to set a pad 3 into position, it suffices to slide plate 10 toward pin 16 and then to rotate it about axis X while pushing the corresponding portion 23f of the spring. This rounded shape is such that the pressure exerted by lug 28 on the spring causes the portion 23f of said spring to slide in the notch 27 of the frame without escaping therefrom until it is moved past the end of lug 28. Then spring 23 expands and its portion 23f moves back toward the bottom of notch 27 into contact with the bottom of the notch 29 of lug 28.

This arrangement is very simple and does not require the use of a special tool. It ensures perfect safety of setting since the pad drops on the ground if the portions 23f of the spring are not engaged into the notches of the frame.

Another advantage of this setting is that it holds the pads under a slight longitudinal compression and thus permits of avoiding small vibrations which produce noise. This may make it unnecessary to provide supplementary means for damping vibrations.

Figure 2:
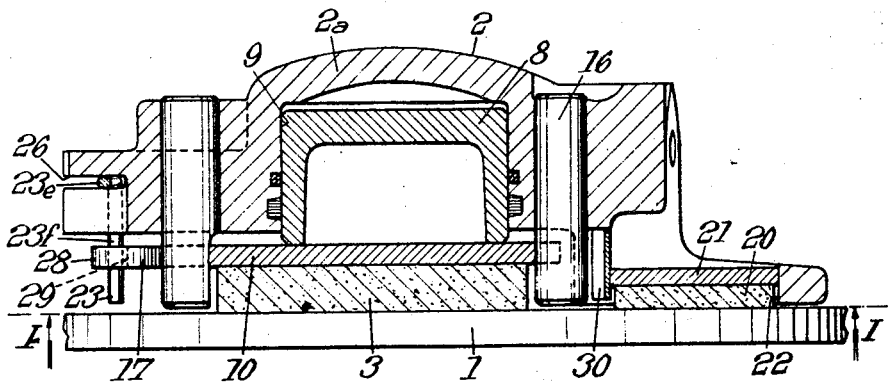

This brake may further include a spring acting upon the plate 21 of the auxiliary brake for preventing vibrations thereof. For this purpose, as shown by FIGS. 1 and 2, use is made of a leaf spring 30 of sufficient dimensions in the direction parallel to the axis of disc 1 for remaining applied against plate 21 whatever be the wear of pad 20. Advantageously, as shown, such a spring is placed between pin 16 and the transverse wall 31 which limits a notch connecting the recess of the frame in which is placed friction structure 3, 10 with housing 22. This plate is given a shape such that, on either side of the area thereof that bears upon pin 16, it is provided with two areas bearing upon transverse wall 31. Thus plate 30 remains in position even when the corresponding pad 20 is removed.

According to a modification, frame 2 or disc 1 might be capable of sliding parallelly to the axis of said disc and only one of the friction pads 3 would be movable, for applying the brake, with respect to frame 2.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:
1. A disc brake which comprises, in combination,
   a disc rotatable about an axis perpendicular thereto and passing through the center thereof,
   a stationary brake frame disposed astride a portion of the periphery of said disc,
   two flat friction members parallel to said disc and located on opposed sides thereof opposite each other, said friction members being carried by said brake frame and at least one of them being slidable with respect to said frame in a direction parallel to said axis to permit movements of said friction members toward each other parallel to said axis to clamp said disc tightly between them,
   each of said friction members including two cylindrical bearing surfaces the generatrices of which are parallel to said disc axis and the respective cross sections of which through planes parallel to said disc are circular arcs having a common center located on a second axis parallel to said disc axis,
   said frame including cylindrical holding surfaces of the same shape as said bearing surfaces, and adapted to cooperate therewith, respectively,
   each said friction member comprising a lug rigid therewith and extending outwardly therefrom at a region of said friction member spaced apart from said second axis,
   fixed abutment means mounted in said frame against which abutment means said lugs can abut, and
   a spring for preventing pivoting of said friction members about said second axis, said spring being hooked onto said brake frame and being adapted to engage said lugs and to urge said lugs elastically and yieldingly against said fixed abutment means to maintain said friction members in the position thereof where said bearing surfaces cooperate with said holding surfaces, the elastic force of said spring being greater than the maximum force that may be exerted on said spring by said lugs during operation of said brake, without preventing said spring from being moved manually away from said lugs for removing said friction members.

2. A brake according to claim 1 wherein said spring includes a middle portion hooked to said frame and extending across the plane of said disc and two end portions forming retractable abutments for said friction members, respectively.

3. A brake according to claim 2 wherein said spring consists of a wire which includes, symmetrically on either side of its middle portion and successively from said middle portion, a bent portion, a first straight portion substantially perpendicular to the radius of said disc passing through the middle point of said middle portion, a coiled portion having its axis substantially parallel to that of the disc, a second straight portion parallel to said disc and extending toward the axis thereof to a distance from said disc axis smaller than the disc radius, and, finally, one of said above mentioned end portions.

4. A brake according to claim 3 wherein said brake frame is provided with an aperture the width of which, measured parallel to the axis of said disc, is just greater than the distance between said first straight portions of said spring, and also a projection capable of holding said spring middle portion.

5. A brake according to claim 4 wherein said frame is provided, on the one hand, for each of said second straight portions of said spring, with a notch keeping said second straight portions at a fixed distance from each other and, on the other hand, for each of said end portions of said spring, with a notch, holding it at a predetermined distance from the axis of said disc.

6. A brake according to claim 3 wherein each of said lugs is provided with a notch adapted to accommodate one of the end portions of said spring.

7. A brake according to claim 6 wherein the outline of each said lug forms an inclined surface leading to the notch thereof and capable, when the corresponding friction member is pivoted about said second axis in the direction which moves said lug toward its corresponding abutment means, of moving the end portion of said spring as far as the end of said lug notch.

References Cited

UNITED STATES PATENTS

| | | | |
|---|---|---|---|
| 3,256,959 | 6/1966 | Eggstein | 188—73 |
| 3,265,160 | 8/1966 | Elberg et al. | 188—73 |
| 3,285,371 | 11/1966 | Cadiou | 188—73 |
| 3,331,471 | 7/1967 | Redmayne | 188—73 |

MILTON BUCHLER, *Primary Examiner.*

GEORGE E. A. HALVOSA, *Assistant Examiner.*